Patented Dec. 28, 1943

2,337,924

UNITED STATES PATENT OFFICE 2,337,924

AROMATIC SULPHONIC ACIDS HAVING CAPILLARY-ACTIVE PROPERTIES AND A PROCESS OF PREPARING THEM

Carl Platz and Hermann Wagner, Frankfort-on-the-Main, Helmut Keppler, Leverkusen-Wiesdorf, and Johannes Nelles, Leverkusen-Schlebusch, Germany, assignors, by mesne assignments, to General Aniline & Film Corporation, New York, N. Y., a corporation of Delaware No Drawing. Application May 4, 1938, Serial No. 205,980. In Germany May 8, 1937

2 Claims. (Cl. 260—512)

The present invention relates to aromatic sulphonic acids having capillary-active properties and to a process of preparing them.

We have found that sulphonic acids of capillary activity may be obtained by treating with sulphonating agents products having the general formula R'' Ar OR', wherein Ar stands for a member of the group consisting of benzene and naphthalene nuclei, R'' stands for a member of the group consisting of aliphatic and cycloaliphatic radicals containing at least four carbon atoms and preferably hydrocarbon radicals such as dodecyl, tetradecyl, octadecyl and oleyl, R' stands for a member of the group consisting of aliphatic and cycloaliphatic hydrocarbon radicals, preferably aliphatic hydrocarbon radicals containing 1–4 carbon atoms, R'' and R' containing together at least eight carbon atoms, and R'', standing in para-position to OR'.

Alkylated phenyl esters which are suitable for the process of the invention are derived from phenols containing at least one substituent with 4 carbon atoms. The substituted phenols are obtained, in known manner, by alkylating phenol, cresol, xylenol, and naphthol, by means of an aliphatic or a cyclo-aliphatic alcohol or a hydrogen halide ester thereof or an olefine corresponding with such alcohol. The following alcohols are, for instance, appropriate for the alkylation: butyl alcohol, isobutyl alcohol, tertiary butyl alcohol, hexyl alcohol, isohexyl alcohol, dodecyl alcohol, octadecyl alcohol, oleyl alcohol, cyclohexanol, menthol, borneol, monobutyl glycol, likewise alcohols formed by condensing aldehydes with ketones or by aldol condensation of aldehydes and subsequent hydrogenation, for instance, alpha-ethylhexyl-alcohol, methyl-isopentyl-carbinol and dipentyl-carbinol. There may also be used commercial mixtures of the above-mentioned substances as, for instance, the alcohols of high molecular weight obtained by catalytically hydrogenating carbon monoxide, or mixtures of alcohols of high molecular weight obtained by oxidising mineral oil or paraffin, naphthene alcohols or alcohols corresponding with the resin acids, such as abietinols and the like. There may also be used with advantage, for the alkylation, polymerised olefines, such as the polymerization products of propylene or butylene, for instance, di-or tri-isobutylene.

These phenols are esterified by means of an aliphatic or a cyclo-aliphatic carboxylic acid. Carboxylic acids suitable for the process are, for instance, acetic acid, butyric acid, caproic acid, caprylic acid, capric acid, undecylic acid, lauric acid, palmitic acid, stearic acid, montanic acid, carboxylic acids formed by oxidation of the alcohols obtained by condensing aldehydes with ketones or by aldol condensation of aldehydes and subsequent hydrogenation, for instance, alpha-ethylhexylic acid. There may also be used commercial mixtures of the aforesaid carboxylic acids, for instance fatty acid mixtures found in nature, such as in palm nut oil or palm oil, or fatty acid mixtures obtained by oxidizing mineral oil or paraffin. Carboxylic acid mixtures obtained by oxidation of alcohol mixtures formed, as a by-product, in the catalytical hydrogenation of carbon monoxide may likewise be used. Naphthenic acid mixtures and resinic acid mixtures are also suitable.

Ethers suitable for the present process are the aryl ethers. The aryl ethers to be sulphonated are derived from monohydric phenols, for instance, from substituted phenols and naphthols. The substituted phenols suitable for the present process have already been mentioned.

The phenols are etherified, for instance by causing an alkylated phenol to react, in known manner with an aliphatic or cyclo-aliphatic alcohol. The most convenient method of effecting etherification is to cause a phenolate or an alcoholate to react with a hydrogen halide ester of an aliphatic or a cyclo-aliphatic alcohol or with an alkali salt of an acid sulphuric acid ester of such alcohol. Besides the alcohols already mentioned, which are suitable, in the form of their hydrogen halide esters or in the form of the sodium salts of their acid sulphuric acid esters, for etherifying the phenols, there may also be named the methyl, ethyl and isopropyl alcohols.

Aryl ethers which are suitable for use in the present invention are, for instance, iso-hexyl-phenyl hexyl ether, isooctylphenyl isooctyl ether, isobutylphenyl isobutyl ether, isooctylphenyl isobutyl ether, isobutylphenyl dodecyl ether, cyclohexylphenyl iso-octyl ether, di-iso-butylphenyl isobutyl ether, di-iso-octylphenyl methyl ether, dibutylnaphthyl isobutyl ether and isononynylnaphthyl isobutyl ether.

The esters and ethers are sulphonated by means of sulphuric acid, fuming sulphuric acid, sulphuric anhydride, chlorosulphonic acid and fluoro-sulphonic acid. In many cases it is advantageous to work in the presence of diluents, such as dimethyl ether, diethyl ether, $\beta.\beta'$-dichlorodiethyl ether, dichloromethane, dichloroethane, trichlorethylene, carbon tetrachloride, cyclohexane, sulphur dioxide; or in the presence of a tertiary base, such as pyridine.

Water-soluble compounds of the kind claimed are for instance:

The sodium sulphonate of iso-octylphenol-iso-octylic acid ester:

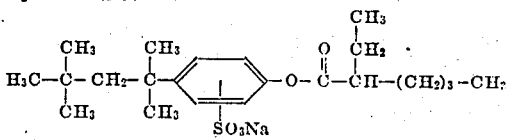

obtained by sulphonating the iso-octylphenol-isooctylic acid ester.

The potassium sulphonate of iso-butylphenol-lauric acid ester:

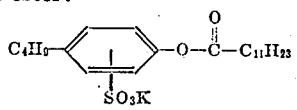

The sodium sulphonate of cyclohexylphenyl-isododecyl ether:

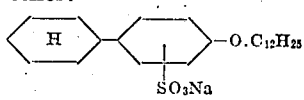

The compounds obtained by the present invention have capillary active properties and are suitable for the treatment of materials of every kind, such as textiles, leather or the like. The products have a high wetting power; they may also be used with advantage as levelling and through dyeing agents. Some of the products have a good washing capacity. Especially compounds having branched aliphatic chains are distinguished by a good wetting power, even in mercerizing liquors. The products may be used, as such, in admixture with one another or in admixture with other capillary-active substances, such as soap and the known textile adjuvants, in admixture with colloidal substances, such as mucilage, glue, water-soluble cellulose derivatives, starch, bentonite or the like with organic solvents, such as butanol, xylenyl-glycol, or with inorganic salts, such as Glauber's salt, sodium carbonate, alkali salts of ortho-, pyro- or meta-phosphoric acid or with agents yielding oxygen, such as sodium perborate, sodium per-pyrophosphate or sodium hypochlorite and so on.

The following examples serve to illustrate the invention but they are not intended to limit it thereto, the parts being by weight:

(1) 152 parts of an alkyl-phenol, obtained by condensing a monochlorination product of middle oil (a hydrocarbon mixture formed in the catalytic hydrogenation of carbon under elevated pressure and having an average molecular weight of 170) and phenol, in the presence of a catalyst, such as aluminium chloride or borotrifluoride, are methylated, at 80° C., by means of 65 parts of dimethyl sulphate in the presence of a caustic potash solution containing methanol. Unaltered phenol, a small amount of which may be present, is removed by extracting the petroleum ether solution by means of a methyl alcoholic lye, 85 to 100 parts of methyl ether boiling at 160° C. to 240° C., under a pressure of 4 mm., are obtained. The content of this product in hydroxyl is 0.05 per cent. of OH.

27 parts of this methyl ether are dissolved in 40 parts of cyclohexane. 14 parts of chlorosulphonic acid are then run in, while stirring, at a temperature of 10° C. to 20° C. in the course of half an hour, and the whole is then stirred, for two hours, at the same temperature. The whole is then poured on 100 parts of ice and neutralized by means of 21 parts of a caustic soda solution of 42° Bé. and evaporated. 42 parts of a white powder, readily dissolving in water, are obtained. The product is suitable for use as a wetting agent in a neutral as well as in an alkaline or acid medium. The iso-butyl ether of the above-mentioned phenol, which boils, under a pressure of 4 mm., at 170° C. to 250° C., may be sulphonated in the same manner, and a wetting agent is obtained which is effective even in very low concentrations.

(2) 206 parts of iso-octyl-phenol and 150 parts of di-iso-butylene chloride are heated at 145° C. to 150° C., for several hours in an autoclave provided with a stirrer, in the presence of a methyl-alcoholic caustic potash solution. After cooling, the salt is separated and unaltered iso-octyl-phenol is removed by means of a methyl alcoholic lye.

32 parts of this product (boiling, under a pressure of 5 mm., at 140° C. to 142° C.) are dissolved in 65 parts of cyclohexane and sulphonated, in the manner indicated in Example 1, by means of 13.5 parts of chlorosulphonic acid. A product easily soluble in water and having a good foaming power is obtained; it is suitable for use as a carbonizing and wetting agent.

(3) 33 parts of isobutylphenol lauric acid ester are dissolved in 60 parts of ether, 13 parts of chlorosulphonic acid are then run in, at a temperature of —5° C. to 0° C., in the course of half an hour and the whole is stirred, for some time, at this temperature. The whole is then neutralized, at a temperature below +10° C., by means of caustic soda solution of 40° Bé. in such a manner, that the mass is always alkaline to litmus paper. A paste is thus obtained which may be diluted with water to a clear, strongly foaming solution. This solution has a good wetting and washing power.

(4) The alcohols of a high molecular weight obtained as by-products during the technical preparation of methyl alcohol by hydrogenation of carbon monoxide are fractionated. By splitting off water the fraction containing alcohols with 6 to 7 C-atoms is transformed into an olefine-mixture which is dimerized in known manner by means of phosphoric acid or sulphuric acid. The mixture of isododecylene and isotetradecylene thus obtained is condensed with phenol in the presence of a catalyst such as borontrifluoride. The mixture of the alkyl-phenols obtained is then etherified by means of diethylsulphate and the corresponding ethylether is obtained which distils at 160° C. to 260° C. under a pressure of 6 mm. This ether is sulphonated as described in the foregoing examples and neutralized with the aid of caustic soda solution. The reaction product obtained mainly consists of compounds of the following constitution:

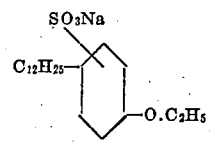

and

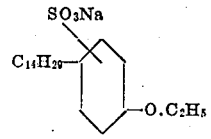

It may be applied as a washing agent for wool or cotton of very good foaming and cleansing power or as a levelling agent and a through-dyeing agent in dyeing in an acid bath.

(5) 31 parts of sodium iso-octylphenolsulphonate are mixed with 20 parts of palm nut fatty acid chloride and the temperature is gradually raised to 100° C. to 120° C. When hydrochloric acid no longer escapes the whole is neutralized at a low temperature by means of sodium carbonate. In this manner the palm nut fatty acid ester of the sodium iso-octylphenolsulphonate is obtained. The product may be used as washing agent for wool.

(6) Fuming sulphuric acid containing 20 per cent. of sulphuric anhydride is added drop by drop at 15° C. to 20° C. to 30 parts of para-dodecylphenyl-n-propylether (obtainable by condensing dodecylene with phenol and etherifying the dodecylphenol in the form of the potassium phenolate with propylbromide) until a test portion of the reaction product dissolves in water to a clear solution. The whole is then poured on 50 to 100 parts of ice and neutralized by means of caustic potash solution. A white paste is obtained which may be used as washing agent. The active substance has the following constitution:

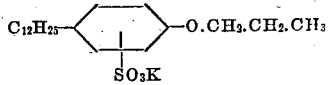

(7) 22 parts of fuming sulphuric acid containing 20 per cent. of sulphuric anhydride are added at 0° C. to 10° C. to 39 parts of isohexylphenolester of a mixture of paraffin-carboxylic acids which mixture is obtained by the oxidation of paraffin and contains on an average 12 to 14 C-atoms; the whole is stirred until the reaction product dissolves in water to a clear solution. The product is worked up in known manner and neutralized. A product is obtained the main constituent of which having the following constitution:

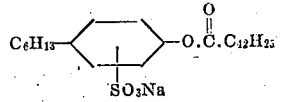

It may be used as cleansing agent.

We claim:

1. Products having the general formula

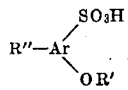

wherein Ar stands for a member of the group consisting of benzene and naphthalene nuclei; R'' is a member of the class consisting of dodecyl, tetradecyl, octadecyl and oleyl; R' is an aliphatic hydrocarbon radical containing 1 to 4 carbon atoms, and R'' stands in para-position to OR'.

2. A product having the following constitution:

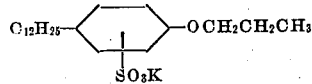

CARL PLATZ.
HERMANN WAGNER.
HELMUT KEPPLER.
JOHANNES NELLES.